(12) United States Patent
Hill

(10) Patent No.: US 9,564,067 B2
(45) Date of Patent: *Feb. 7, 2017

(54) INFLATABLE EXHIBIT OF A HUMAN HEART AND METHOD

(71) Applicant: Medical Inflatable Exhibits, Inc., Houston, TX (US)

(72) Inventor: Lauren Hill, Houston, TX (US)

(73) Assignee: Medical Inflatable Exhibits, Inc., Houston, TX (US)

( * ) Notice: Subject to any disclaimer, the term of this patent is extended or adjusted under 35 U.S.C. 154(b) by 69 days.

This patent is subject to a terminal disclaimer.

(21) Appl. No.: 14/254,421

(22) Filed: Apr. 16, 2014

(65) Prior Publication Data

US 2014/0255894 A1 Sep. 11, 2014

Related U.S. Application Data

(63) Continuation of application No. 12/798,057, filed on Mar. 29, 2010, now Pat. No. 8,727,786.

(60) Provisional application No. 61/164,435, filed on Mar. 29, 2009, provisional application No. 61/338,885, filed on Feb. 25, 2010.

(51) Int. Cl.
*G09B 23/28* (2006.01)
*G09B 23/30* (2006.01)

(52) U.S. Cl.
CPC .................................. *G09B 23/30* (2013.01)

(58) Field of Classification Search
USPC .. 434/262, 267, 268, 272, 365, 433; 472/70, 136, 137
See application file for complete search history.

(56) References Cited

U.S. PATENT DOCUMENTS

| 4,164,829 | A | 8/1979 | Sadler |
| 4,340,929 | A | 7/1982 | Konikoff et al. |
| 4,865,550 | A | 9/1989 | Chu |
| 5,321,593 | A | 6/1994 | Moates |
| 5,634,797 | A | 6/1997 | Montgomery |
| 6,342,014 | B1 | 1/2002 | Lynch |
| 6,551,108 | B1 | 4/2003 | Weinspach |
| 6,679,007 | B1 | 1/2004 | Minchew et al. |

(Continued)

FOREIGN PATENT DOCUMENTS

WO     WO 97/27573     7/1997

OTHER PUBLICATIONS

Felipe Dulzaides, "What is Essential is Invisible to the Eyes," YouTube Video, http://www.youtube.com/watch?feature=playerembedded&v=HpChCUVn.qi.q, uploaded Nov. 23, 2008.*

(Continued)

*Primary Examiner* — Kurt Fernstrom
(74) *Attorney, Agent, or Firm* — Alberto Q. Amatong, Jr.; Amatong McCoy LLC

(57) ABSTRACT

An inflatable exhibit of a heart includes an inflatable infrastructure inflatable to a three-dimensional partial representation of the heart at a scale greater than at least, 10:1, but more preferably greater than 20:1, and most preferably, greater than 25:1. The infrastructure includes a cross-sectional plane thereacross. The exhibit further includes a walk-through passageway defined, at least, in part by the inflated infrastructure, and extending through the inflated infrastructure. The cross-sectional plane defines a plane of the passageway.

26 Claims, 8 Drawing Sheets

(56) References Cited

U.S. PATENT DOCUMENTS

| | | | |
|---|---|---|---|
| 6,739,735 | B2 | 5/2004 | Talamo et al. |
| 6,929,382 | B2 | 8/2005 | Kuisma |
| 7,220,127 | B2 | 5/2007 | Ellingson et al. |
| 7,352,339 | B2 | 4/2008 | Morgan et al. |
| 7,753,577 | B2 | 7/2010 | Teeters |
| 7,931,540 | B2 | 4/2011 | Lokos |
| 8,093,823 | B1 | 1/2012 | Ivey et al. |
| 2003/0048641 | A1 | 3/2003 | Alexanderson et al. |

OTHER PUBLICATIONS

Jonathon Morgan, "Prevent Cancer With the Inflatable Super Colon", Mar. 8, 2007.*

Felipe Dulzaides, "Bouncing Heart," You Tube Video, https://www.youtube.com/watch?v=okTdlJqP-M8, uploaded May 8, 2007.*

Non-Final Office Action mailed Dec. 19, 2014, issued in Re-Examination Control No. 90/020,072 in an Ex Parte Reexamination Request of U.S. Pat. No. 8,727,786 [12 pages].

Supplement and Correction to Response to Office Action in Ex Parte Reexamination mailed Dec. 19, 2014, submitted in Reexamination Control No. 90/020,072 in an Ex Parte Reexamination Request of U.S. Pat. No. 8,727,786 [13 pages].

Order Granting Request for Ex Parte Reexamination mailed Sep. 18, 2014 in Re-Examination Control No. 90/020,072 in an Ex Parte Reexamination Request of U.S. Pat. No. 8,727,786 [17 pages].

Bitgood, Stephen; Benefield, Arlene; "A Critical Appraisal of the Heart Exhibition at the Franklin Institute of Science", Visitor Behavior, vol. X, No. 3, p. 14-16; Fall, 1995.

Fitzgerald, Susan; "Pumped Up the Franklin Institute's Famous Walk-Through Heart Has Been Rejuvenated for a New Exhibit on Care of the Vital Organ", Philly.Com Articles Collections, Sep. 27, 2004.

Good Samaritan Hospital, Kearney, Nebraska; News Release: "Free, Interactive Super Colon Display is Larger-Than-Life Lesson about Colorectal Cancer", Mar. 18, 2008.

Jonathon Morgan, "Prevent Cancer With the Inflatable Super Colon", Mar. 8, 2007 [retrieved online Mar. 8, 2013].

Sloan, liya; "Arizona Cancer Center Welcomes 'Super Colon'", The University of Arizona Office of University Communications, UA News, Feb. 25, 2008.

The Franklin Institute, "The Giant Heart, A Healthy Interactive Experience"; www.2.fi.edu/exhibits/permanent/giant-heart.php ; 4 pages, Printed Dec. 21, 2011.

www.google.com Search results for "Franklin institute heart exhibit" images; pp. 1-6; including 6 pages of images copied from Google Search. The Franklin Institute, 222 North 20th Street, Philadelphia, PA 19103. Search conducted on Dec. 21, 2011.

Replacement Request for Ex Parte Reexamination Request of U.S. Pat. No. 8,727,786, filed Aug. 1, 2014 (216 pages).

* cited by examiner

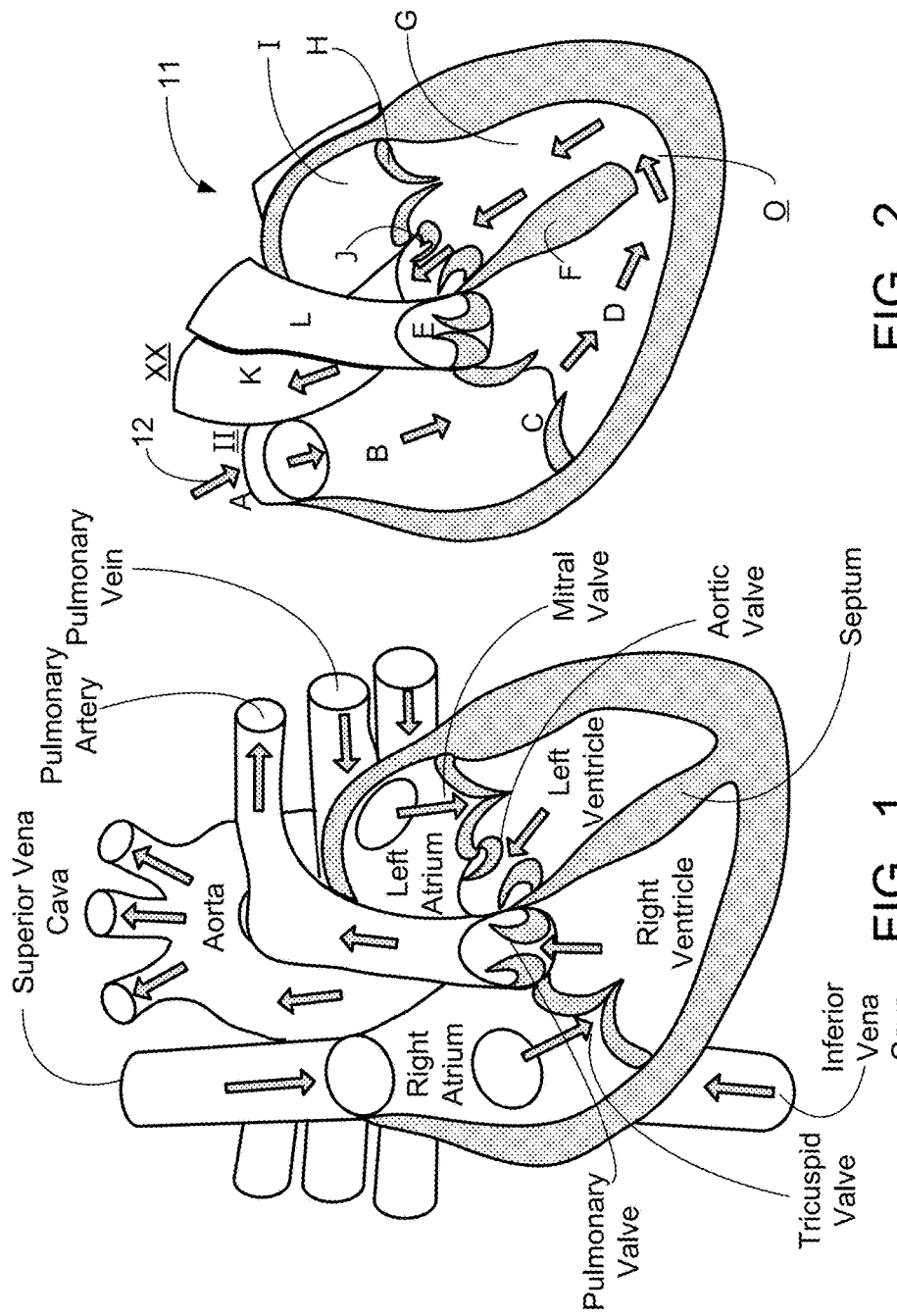

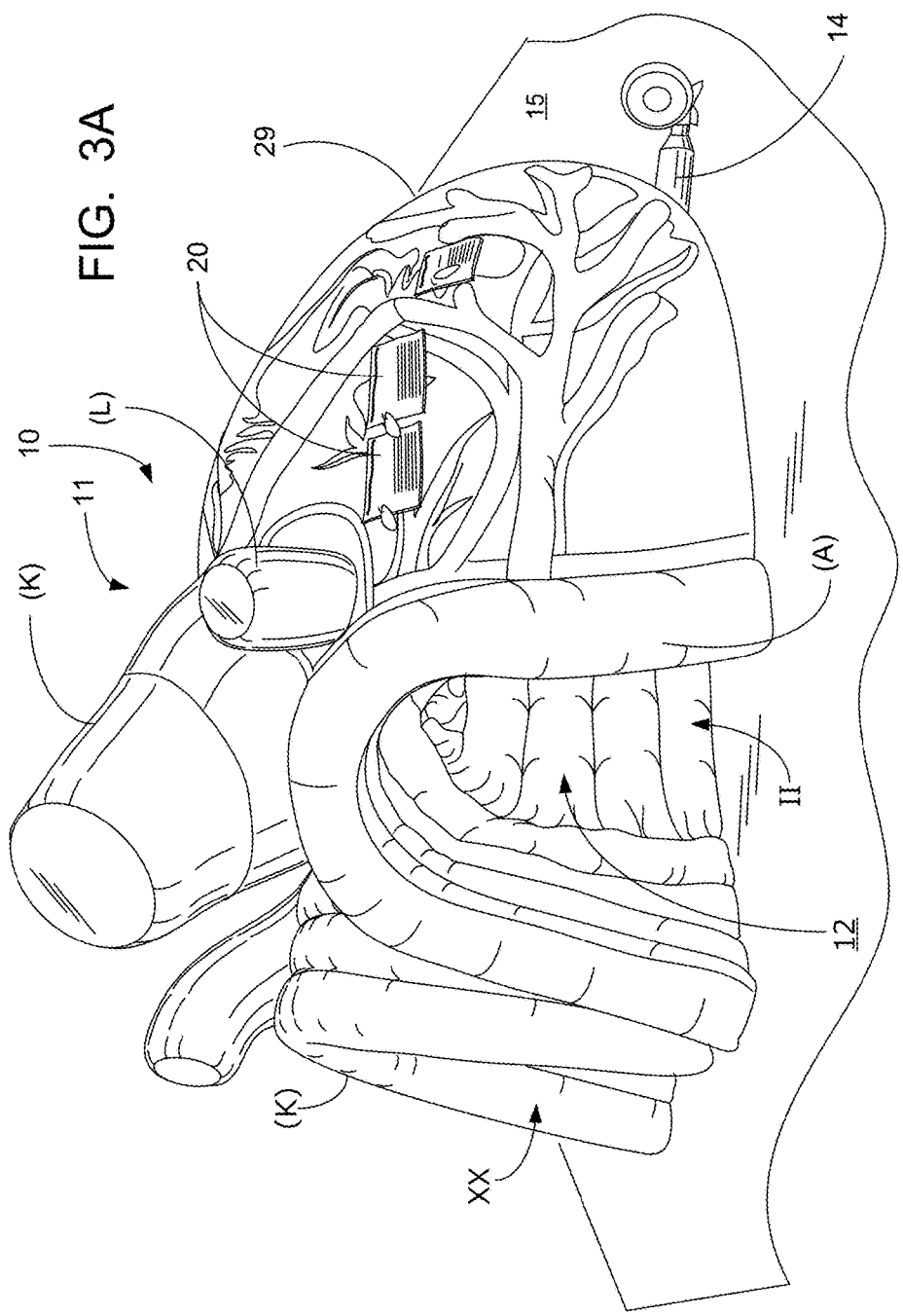

FIG. 3B
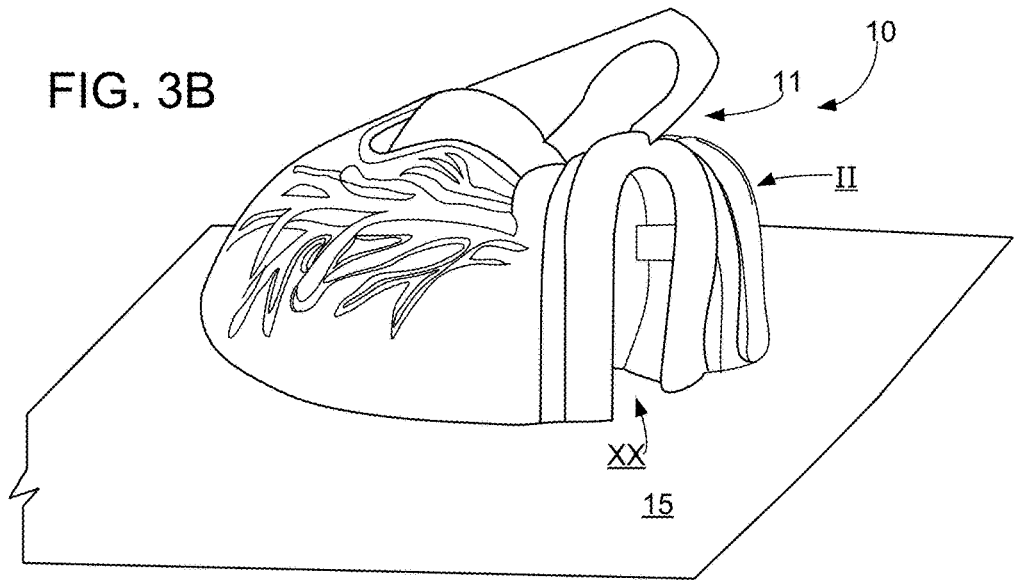
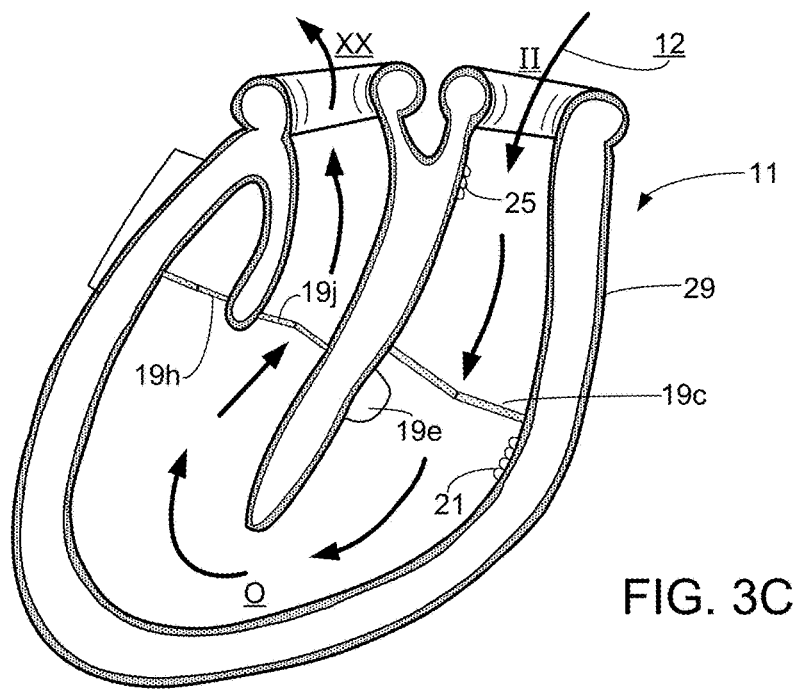
FIG. 3C

PORTABLE HEART WITH DUAL WALK-THROUGH PATHS

INFLATABLE EXHIBIT OF A HUMAN HEART AND METHOD

BACKGROUND OF THE INVENTION

The present application is a Continuation application of U.S. patent application Ser. No. 12/798,057, filed Mar. 29, 2010 (now allowed), which claims the benefit of, and priority to, the filing date of each of U.S. Provisional Application Ser. No. 61/164,435 filed on Mar. 29, 2009 (now expired) and U.S. Provisional Application No. 61/338,885 filed on Feb. 25, 2010 (now expired). Each of these disclosures is hereby incorporated by reference for all purposes and made a part of the present disclosure.

The present disclosure relates generally to an apparatus and method for displaying or exhibiting a human organ for educational and informative purposes. The disclosure is particularly applicable to an inflatable exhibit of a human heart and a method of exhibiting same.

The human heart is arguably the most important organ in the body. Heart disease is the leading cause of death in the United States, accounting for one death every minute. Certain forms of heart disease may be prevented by altering life styles, food choices, and/or exercise patterns. Certain forms of heart disease may also be successfully treated. Valve replacements, cardiac bypass grafts, and coronary artery stent implants are just some of the procedures employed to treat heart diseases. In any event, there remains a need to educate the public about the types and causes of heart disease and the methods of prevention and medical treatments. This is especially true for younger people, as it is now known that some types of heart disease start with poor choices made in childhood.

A variety of presentation tools and techniques are available to aid in educating an audience about the heart and heart disease. Pictures, graphics, and videos may be used to illustrate parts of the heart and may be accompanied by literal or audio narrative to teach students and audiences about the different parts and functions of the heart, and the medical conditions relevant to the illustrated parts. Computer-aided simulations and animations can also be used to explain detailed or more complex features of the heart and heart disease. These are particularly useful in illustrating blood flow through the heart as well as certain effects of disease on the heart.

A physical model or representation of the heart provides additional flexibility as a teaching aid. A three-dimensional model offers a more accurate representation of the heart. It can also provide various visual perspectives from which the audience can view the heart, heart functions, and the effects of heart disease. Life-size models (and cadaver hearts) provide, of course, a more accurate representation than a smaller scale model.

Larger-scale models provide an even greater capacity to display parts of the heart, and thus, can be more effective in conveying the more detailed and complex features of the heart, its functions, and the effects of heart disease.

A large-scale model of the heart that may help provide some background for the present invention is one known as the "Giant Heart" and is on exhibit at the Franklin Museum in Philadelphia, Pennsylvania. This "Giant Heart" is equipped with a walk-through pathway that allows the visitor to enter the heart model and access the various chambers of the heart in a sequence that replicates the normal blood flow through the heart. While allowing the visitor an interactive educational experience, including an internal viewing perspective of the heart, the Franklin Museum heart model is a permanent structure and cannot be readily moved and displayed at different sites. The Franklin Museum heart model is also a rigid, multi-story structure that requires the visitor to ascend from the first story to the second story (or in reverse) to traverse the exhibit pathway.

There is a need for an improved large-scale, three-dimensional model or representation of the heart that is readily movable and readily erectable (i.e., portable). There is also a need for such an improved heart model with a walk-through passageway that is efficient in informing the visitor and in directing the visitor through the heart chambers. Such a walk-through passageway preferably employs a pathway that is easily traversed, but yet supports and enhances the educational objective of the exhibit.

BRIEF SUMMARY OF THE INVENTION

The present disclosure relates generally to a physical representation or model of a human heart. In another aspect, the disclosure is directed to a large-scale, three-dimensional representation of the heart that is walk-through accessible, portable, and/or provides an internal perspective. In preferred embodiments, the portable representation of the heart is provided by an exhibit that includes a large-scale inflatable structure and a walk-through passageway through the structure adapted for viewing or observing the heart from an internal perspective.

In one aspect, an inflatable exhibit of a human heart is provided that includes an inflatable infrastructure inflatable to a three-dimensional partial representation of the human heart at a scale greater than at least 20:1 (and more preferably, greater than about 25:1). The infrastructure includes a cross-sectional plane thereacross. The exhibit further includes a walk-through passageway defined, at least in part, by the inflated infrastructure, and extending through the inflated infrastructure, wherein the cross-section plane defines a plane of the passageway. In further embodiments, the exhibit includes a generally horizontal base (e.g., a mat) of the inflatable infrastructure. The base provides the cross-sectional plane and defines, at least in part, the walk-through passageway such that the passageway is maintained to a generally one-story pathway. Furthermore, the one-story passageway may include a passage from a representation of the right ventricle into a representation of the left ventricle, wherein the passage is provided by an opening representing a septal defect.

In another aspect, an inflatable model of the human heart is provided that includes a inflatable infrastructure inflatable to a three-dimensional partial representation of the human heart at a scale greater than at least, 20:1, and a walk-through passageway defined, at least in part, by the inflated infrastructure. The infrastructure includes a cross-sectional plane thereacross and extending through the inflated infrastructure. The cross-section plane defines a plane of the passageway. The walk-through passageway includes rooms representing each of the right atrium, right ventricle, and the left ventricle, an inflatable wall between the representation of the left and right ventricles, the wall representing the septum and the opening being made in the wall to represent a septal defect, a first curtain representing the tricuspid valve positioned between the right atrium and the right ventricle, and a second curtain representing an aortic valve positioned downstream of the left ventricle. The walk-through passageway begins at a representation of the superior vena cava leading into the right atrium, then from the right atrium through the first curtain into the right ventricle, from the right ventricle through the opening into the left ventricle, and from the left ventricle through the second curtain and outward of the inflatable structure via a representation of the aorta.

In yet another aspect, a method is provided for exhibiting the human heart for educational purposes. The method entails inflating an inflatable infrastructure to erect a three-dimensional inflated model of the heart set upon a cross-sectional plane of the heart and a walk-through passageway therethrough. A visitor(s) is directed into and through the passageway and through the heart model. The passageway is a one-story path that leads the visitors through separate inflated representations of parts of the heart, whereby the visitor enters the right atrium via the superior vena cava, passes through a representation of the tricuspid valve to enter the right ventricle, passes through an opening in the septum to enter the left ventricle from the right ventricle (the opening representing a septal defect), passes from the left ventricle through a representation of the aortic valve into the aorta, and exits the passageway therefrom.

BRIEF DESCRIPTION OF THE DRAWINGS

The following figures are part of the present specification, included to demonstrate certain aspects of embodiments of the present disclosure and referenced in the detailed description herein.

FIG. 1 is a simplified partial, illustration of a human heart with a cross-sectional view illustrating blood circulation in, through, and out of the heart;

FIG. 2 is a simplified illustration of the human heart model with a walk-through passageway, according to the present disclosure;

FIG. 3A is a perspective view of an inflatable heart exhibit, according to the present disclosure;

FIG. 3B is an alternate perspective view of the exhibit in FIG. 3A;

FIG. 3C is a bottom view of the exhibit in FIG. 3A;

DETAILED DESCRIPTION OF THE INVENTION

Figure 3D:
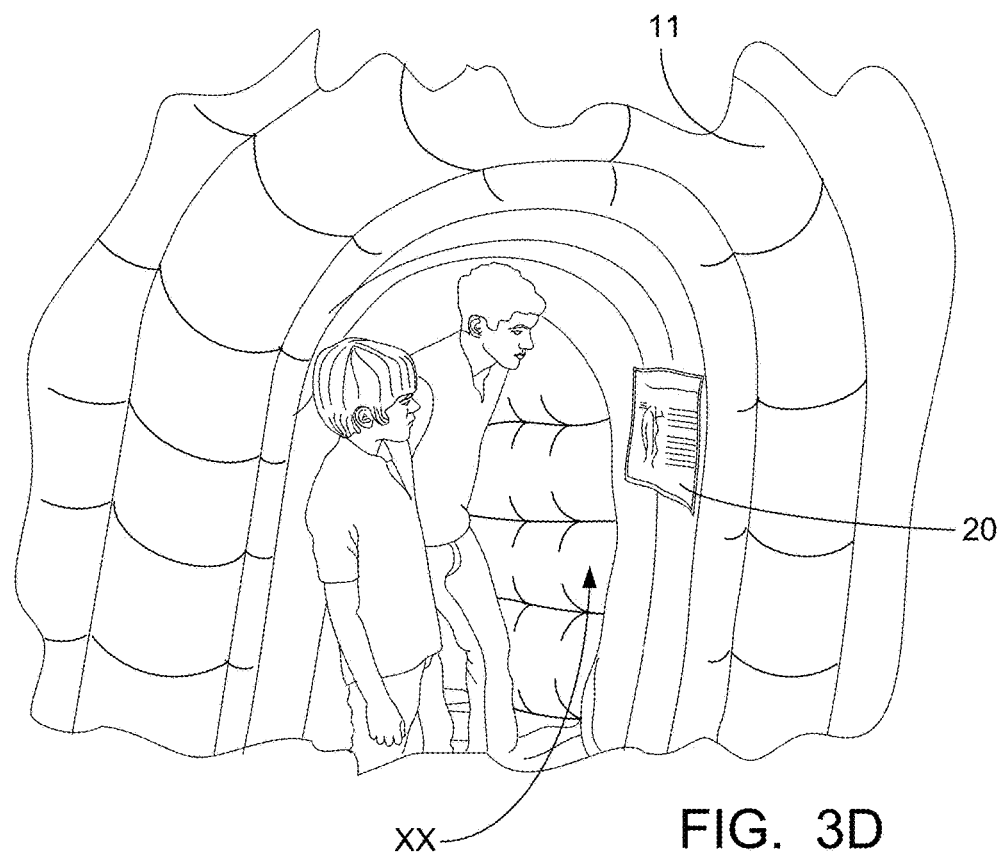
FIG. 3D is a detail view of an exit from the exhibit in FIG. 3A.
Figure 3E:
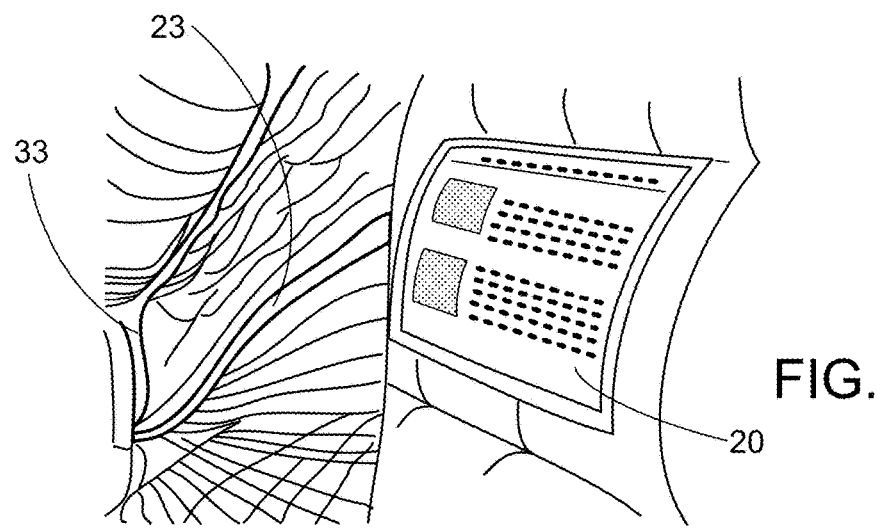
FIG. 3E is a detail view of an inside section of the walk-through passageway of the exhibit in FIG. 3B.

The present invention relates generally to a physical representation or model of a human organ. Aspects of the present disclosure are particularly adapted to a large-scale, three-dimensional representation or model of the human heart that is walk-through accessible, internally observable (can be viewed from internal perspective), and/or portable. FIGS. 2 through 5 depict an exhibit 10 including such a three-dimensional, large-scale model 11 and embodying various other aspects of the invention. The large-scale model 11 features an internal, walk-through passageway 12 that is adapted for viewing or observing the heart from an internal perspective. The walk-through passageway 12 of the invention may utilize heart disease simulations and/or selective simplifications of the heart anatomy to achieve the desired pathway through the heart. The large-scale form of the model allows for the inclusion of the walk-through passageway. The large-scale form also provides perspectives from which to view the heart and an additional platform from which to present information to the visitor. In yet another aspect of the present invention, some of the disadvantages of the large-scale form are mitigated by implementing a light-weight, portable structural design for the model. In the preferred embodiments, portability of the large-scale model is primarily achieved through utilization of an inflatable construction, as further described below.

FIG. 1 is a typical illustration of the inside of the human heart. The simplified illustration uses a cross-sectional view to show, among other things, the four chambers and four valves inside the heart. The cross-sectional view and perspective also illustrate the blood flow (circulation) in and around the human heart. The aorta and pulmonary artery are large arteries that lead out of the heart. The superior vena cave, inferior vena cava, and pulmonary veins are the large veins that empty into the heart. Deoxygenated blood is returned from the body by both vena cava and received in the right atrium of the heart. The tricuspid valve is positioned between the right atrium and right ventricle and allows one-way flow of the de-oxygenated blood into the right ventricle. As depicted in FIG. 1, the right ventricle is below the right atrium and is separated from the left ventricle by an internal wall called the septum.

From the right ventricle, blood is pumped into the pulmonary artery which splits into two, and directs blood into the right and left lung, respectively. From the lungs, oxygenated blood is returned to the heart via pulmonary veins. The oxygenated blood is received by the heart into the left atrium. From the left atrium, the blood flows directly into the left ventricle by way of the mitral valve. The oxygenated blood is pumped out of the heart from the left ventricle and through the aortic valve. The aortic valve leads into the aorta which extends from the left ventricle toward the top of the heart (in this view) and then distributes the oxygenated blood into the different parts of the body.

In the two-dimensional representation of the heart in FIG. 1, the heart takes a position and an orientation that substantially correspond with its normal position and orientation in the human body, when the person's torso is upright. The view of FIG. 1 is a front, elevation view of the heart from a generally parallel perspective at the front of the body, whereby the right chambers (atrium and ventricle) are depicted on the left side of the page and the left chambers are depicted on the left side of the page. Using this perspective, the cross-section is provided by a vertical plane that exposes each of the chambers of the heart. This vertical plane, which is in parallel to the perspective of the drawing, is in substantial alignment with the vertical orientation of the human body and the natural vertical plane occupied by sections of the heart. As used herein, this vertical plane may be referred to as the perspective plane.

The present disclosure describes an inflatable heart exhibit, and more particularly, an inflatable heart model defined, at least partially, by a cross-sectional perspective plane that achieves, in part, a particularly advantageous walk-through passageway 12. The walk-through passageway 12 is illustrated in the simplified schematic of FIG. 2 (by directional arrows) of a heart model 11, and embodied by the exhibit 10 depicted in FIGS. 3A-3F. Referring first to FIG. 2, the intended walk-through passageway 12 features an entrance (II) provided by a representation of the superior vena cava (A) and positioned on the left (as depicted on the page of the Figure) and top of the heart. A visitor traversing the passageway enters from the superior vena cava (A) into the domed first chamber that is the right atrium (B). The visitor's entry is similar to, and corresponds with, the normal return of blood from the body into the heart. As with the de-oxygenated blood, the visitor must advance through the tricuspid valve (C) in order to pass from the right atrium (B) into the adjacent enlarged and separate chamber—the right ventricle (D). In several embodiments, the tricuspid valve (C) is represented by inflated leaflets or curtains that partially block the path between the two right chambers.

As discussed previously, the right ventricle (D) is normally bounded by an internal heart wall, the septum (F), that separates the right ventricle (D) from the left ventricle (G). To achieve the preferred walk-through passageway of the present disclosure, the vertex end of the septum (F) has been modified with an opening (O) between the right ventricle (D) and the left ventricle (G). This opening (O) allows visitors to pass from the right ventricle (D) directly into the left ventricle (G). In this embodiment, the pulmonary valve (E) that normally directs blood from the right ventricle (D) into the lungs, is represented but closed off in favor of the opening into the left ventricle (G). From the left ventricle (G), the visitor advances through the aortic valve (J) and into the exit tube which represents the aorta (K). In one or more preferred embodiments, the left atrium (I) may be closed by the mitral valve (H) to divert the visitor to the aorta (K).

In this embodiment, the opening (O) in the septum (F) also functions as a physical (i.e., three-dimensional) representation and simulation of a feature of a known heart disease—a ventricular septal defect. The ventricular septal defect allows blood to escape from the right ventricle (D) into the left ventricle (G) rather than being pumped directly into the pulmonary artery (L). This causes the heart to work harder to pump more blood, which can lead to enlargement of the heart and other health problems.

As shown in the two-dimensional illustration of FIG. 2, the walk-through passageway 12 represented by the directional arrows provides a direct and generally rectilinear route through the heart. The walk-through passageway 12 is also generally situated on one plane, a "walking plane", and that plane is generally parallel to the perspective plane of the figure. As discussed above, this perspective (and cross-sectional) provides a useful and informative view of the inside of the heart, which also helps to illustrate the modes of blood circulation in the heart.

In one aspect of the disclosure, an inflatable heart exhibit 10 is provided that embodies the walk-through passageway 12 and perspective illustrated in FIG. 2, but in large-scale, three-dimensional form. Referring to FIGS. 3A-3F, the inflatable heart exhibit 10 is preferably constructed at a scale greater than 15:1, more preferably at a scale greater than 20:1, and most preferably, at a scale of around 25:1 or greater (e.g., 30:1). In this embodiment, the exhibit 10 includes an inflatable structure 11 (the heart model 11), a forced air inflation system including a blower 14, and an integrated mat or base 15 on which the inflatable heart structure 11 is set. The inflatable structure 11 inflates into a large-scale, three-dimensional representation or model of a human heart set upon the horizontal mat 15. The mat 15 may be attached to the inflatable structure 11, but is not required to be of an inflatable construction. In this embodiment, the inflated heart structure or simply, the heart model 11, presents a large scale cross-section or partition of the actual heart. The sectional plane is provided near the "back" of the heart and corresponds with the plane of the mat 15. This cross-sectional plane also substantially corresponds with the cross-sectional planes used in FIG. 2 to show the walk-through passageway except the perspective view is reversed (nearly a rear perspective rather than a nearly front perspective). As will be further shown below, the cross-sectional plane of the heart structure 10, as provided by the mat 15, also corresponds to the perspective plane discussed in respect to FIG. 1. In one respect, the inflated heart model 11 is a three-dimensional embodiment of FIG. 2 with the heart oriented and positioned as if laid flat and engaging the surface (i.e., the mat 15).

The mat 15 and the cross-section also define, at least partly, a three-dimensional walk-through passageway 12 as targeted in FIG. 2. In one aspect, the resulting walk-through passageway (of the three-dimensional exhibit) is generally horizontal and thus, the pathway is maintained at one level or story (the bottom plane of which is defined by the mat 15). The mat 15 also defines the perspective plane from which the inside of the heart may be viewed. Thus, when the visitor is on the walk-through passageway and looking up, the visitor takes a perspective substantially corresponding to the aforementioned perspective plane (except that the view is a rear view). The three-dimensional form of the walk-through passageway also allows the same visitor to stand in any portion of the walk-through passageway and look around to observe the internal walls of the heart and any information presented thereon.

The infrastructure of the model 11 is designed to remain inflated as long as there is a continuous flow of air passing through the structure. The heart structure 11 contains a variety of vented chambers and passages, which inflates when the forced air system 14 is activated. Upon inflation, these chambers and passages provide the infrastructure of the model 11 and to some extent, the exhibit 10. It should be noted that the construction and procedure for unfolding and inflating a structure, such as the heart structure 11, is generally known in the relevant art. Portability of the exhibit 10 may be achieved, in part, by fabricating the walls and layers of heart structure 11 out of very lightweight materials. In a preferred embodiment, the heart model 11 employs a lightweight, low-permeability polymer (e.g., PVC) fabric and the entire heart model 11 weighs less than 1000 lbs. Further, the exhibit 10, including the model 11 and mat 15 can be deflated, disassembled, and stowed into a volume that is less than 50 cubic feet.

Figure 3F:
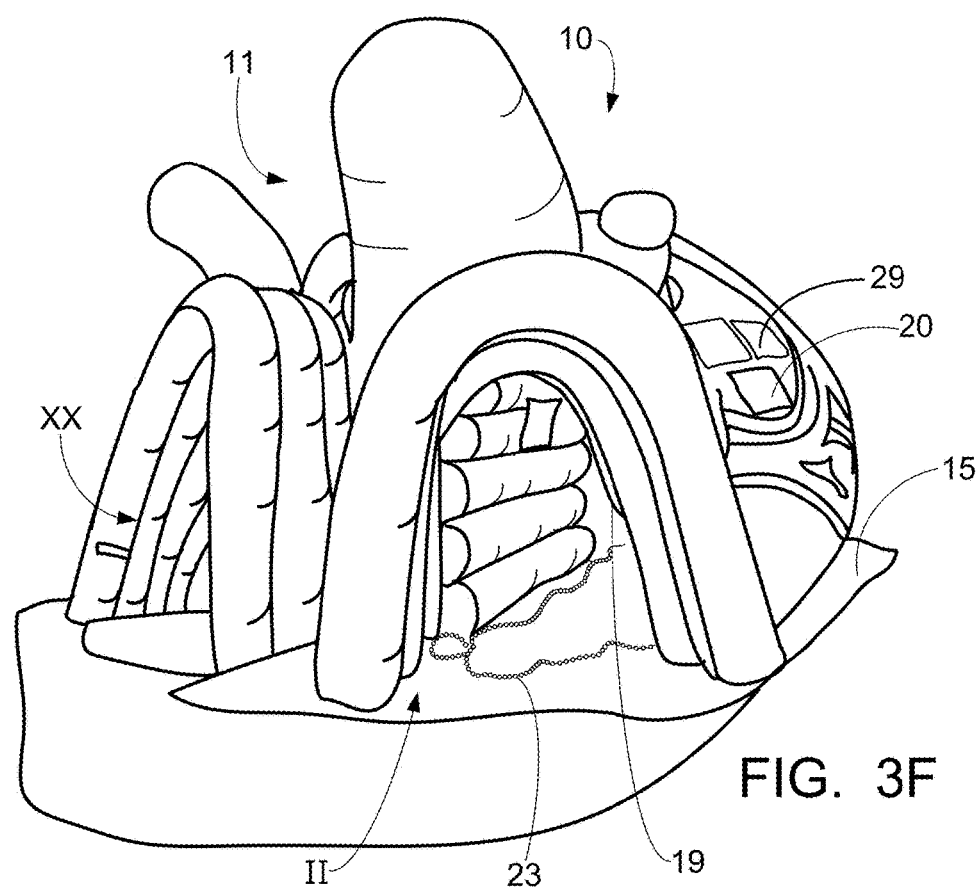
FIG. 3F is an alternate perspective view of the exhibit in FIG. 3A.

Referring to FIGS. 2 and 3A, an exaggerated representation of the superior vena cava (A) is positioned on the perimeter of the inflated heart structure 11 and adjacent the mat 15 to provide an entrance (II) to the walk-through passageway 12. The entrance (II) (and thus, the representation of the superior vena cava (A)) is enlarged and disproportioned to accommodate most visitors. Referring to FIG. 3F, the representation of the superior vena cava (A) leads to a slit curtain or leaflet 19 representing the tricuspid valve (C). The curtain or leaflet 19c is preferably white to off-white in color to contrast the red color of the walls of the passageway 12. At the exhibit's position and orientation of the heart, the aorta (K) is placed generally next to the superior vena cava (A) on the perimeter of the heart structure and also adjacent the mat 15. One portion of the aorta (K)

is also enlarged and opened to provide the exit (XX) of the heart structure 11. The rest of the aorta (K) appears as a nob on the top of the model 11 adjacent the exit (XX).

The all-around walls of the passageway 12 is primarily provided by inflated chambers of the heart structure, which also serve as safety padding. FIG. 3F depicts a portion of the left ventricle (G) in the passageway 12 and a portion of the mitral valve (H) represented by a curtain 19h. As mentioned above, the valves in the passageway 12 may be represented by an opaque plastic (or vinyl) sheet or curtain. In the case of the tricuspid valve (C) and the aortic valve (S), a slit is provided in the curtain (19c, 19s) to allow visitor access therethrough. Preferably, in the case of the mitral valve (H), the curtain or sheet 19h is secured to prevent passage. In the case of the pulmonary valve (E), an inflated protrusion or bulb 19e is provided on the top of the wall just past the tricuspid valve (C), as shown in FIG. 3C.

In yet another aspect, the three-dimensional walk-through passageway 12 provides another educational platform to present additional information regarding the heart (besides observation of the internal structure and components). The walls of the passageway 12, which correspond to internal portions of the heart (e.g., chamber walls), are used to display informational plaques 20 relevant to that portion of the heart. FIG. 4 provides a map of various locations along the passageway 12 at which a plaque 20 may be placed. For example, a plaque 20 relating to the septal defect condition is placed next to the opening in the septum (F) between the right and left ventricles (D, E). Also, a plaque 20 relating to the disease known as mitral valve prolapse is placed next to the mitral valve (G) (see also FIG. 3E). In some cases, the plaque 20 is accompanied by a three-dimensional physical representation 21 of the disease information (e.g., the result of the disease itself or its symptoms). For example, the plaque for septal defect is accompanied by an opening (O) illustrating the defect in the septum (F).

Figure 4A:
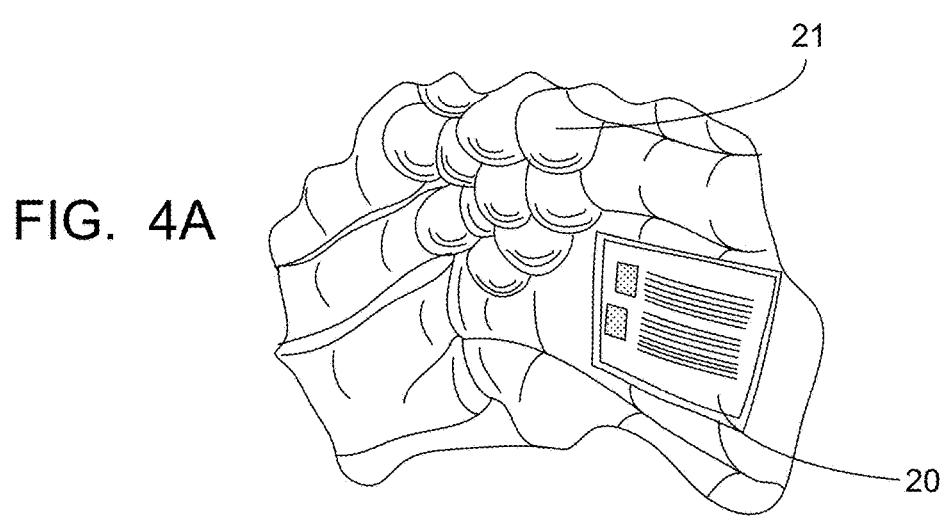
FIG. 4A is a detail view inside the representation of the left ventricle.
Figure 4:
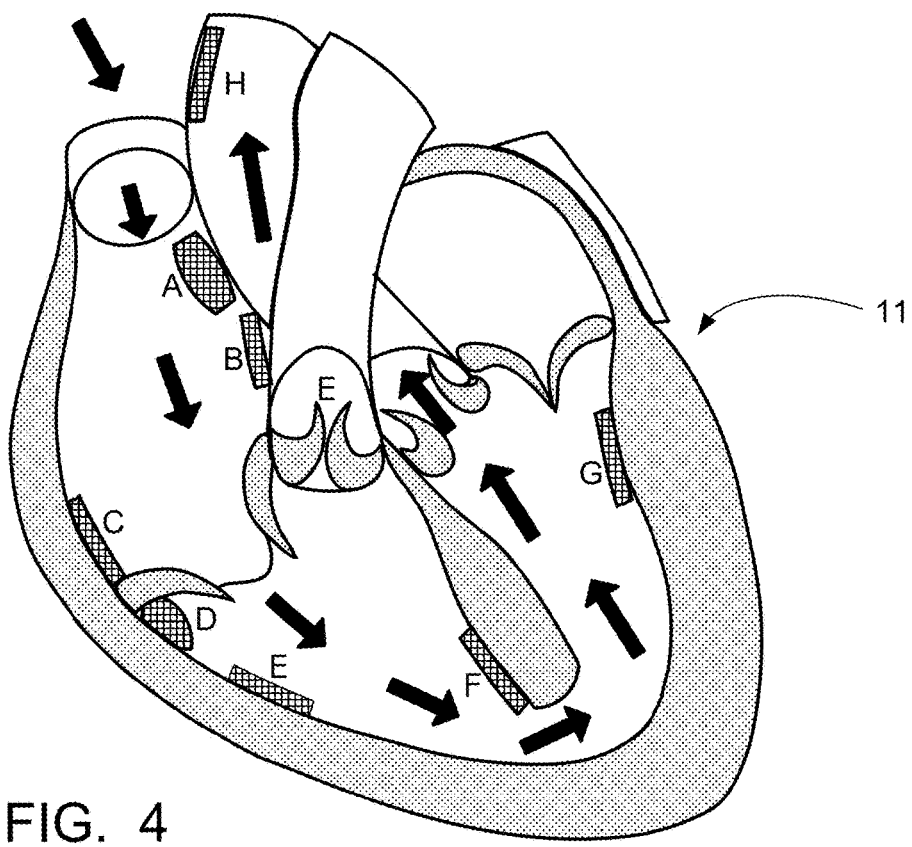
FIG. 4 is a simplified diagram representing the walk-through passageway of the exhibit in FIGS. 2, with a map of locations of informational plaques along the walk-though passageway, according to the present disclosure.

FIG. 4A depicts a plaque 20 provided on a wall of the right ventricle (D) next to the tricuspid valve (C) accompanied by a three-dimensional form or representation 21 of the condition known as endocarditis. Endocarditis is an inflammation of the inner layer of the heart and usually involves the heart valves. The disease is characterized by a lesion that appears as a mass(es) on the heart lining. As shown in FIG. 4A, the lesion or masses are represented as off-color protrusions or bulbs 21 adjacent the tricuspid valve (C). The plaque 20 describing the condition is placed next to the bulbs 21. The bulbs 21 may be constructed from a layer of fabric sewn to the wall of the passageway 12 and including an inlet in communication with the larger inflated chambers that make up the walls of the passageway.

Figure 4B:
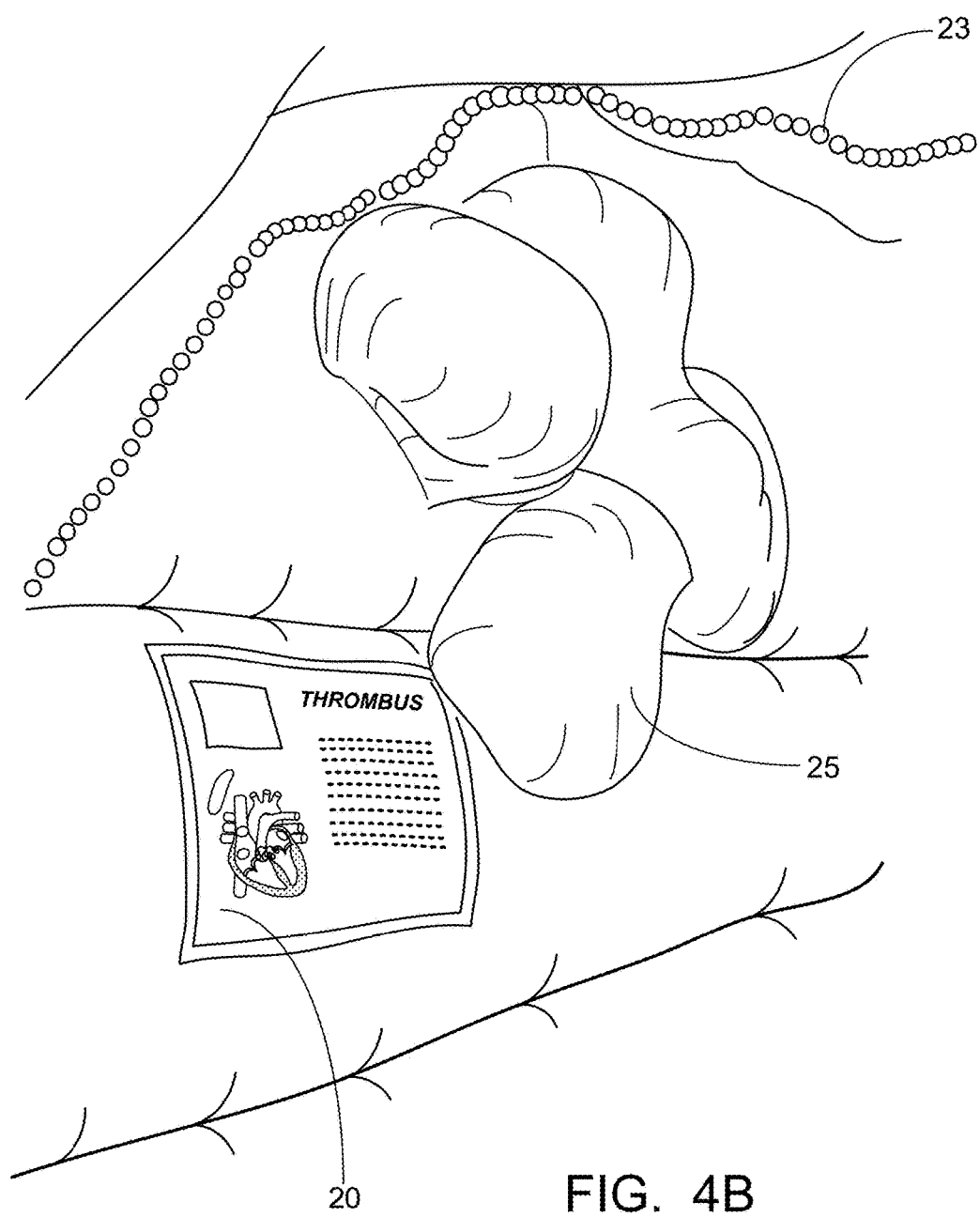
FIG. 4B is a detail view inside the representation of the right atrium.

FIG. 4B depicts a wall in the right atrium (B) on which another plaque 20 is placed. The plaque 20 describes a condition known as thrombus that affects the wall of the heart. Sometimes blood flows more slowly through the blood vessels and forms blood clots or thrombi. The blood clots are simulated as abnormal growths on the walls of the passageway 12. The abnormal growth may be provided by individually inflated bags 25 attached to the wall. The plaque 20 is placed is placed next to the three-dimensional representation 25 of the condition on the wall of the right atrium (B) and readily observable by a passing visitor.

In further embodiments, the chambers that make up the walls of the passageway 12 may be designed and operated (by the inflation system) to contract and expand. By coordinating the contraction and expansion of the various portions of the heart structure, the movement of the beating heart may be simulated and observed by a visitor traveling the passageway 12. The experience may be further enhanced by incorporating and synchronizing audio (e.g., of a normal/ or and abnormal beating heart) with the movement of the walls. In further embodiments, the blood vessels on the walls of the passageway 12 (or outside surface 29) may be provided by transparent elongated tubes through which simulated blood travels. A simple low pressure pumping system may be connected with the tubes to drive synchronized blood flows. Color fluids may be used to simulate and distinguish oxygenated and de-oxygenated blood flow Interior illumination of the movable, inflatable structure 11 can be particularly challenging. Much of the walk-through passageway 12 is a fairly narrow space that is bounded and substantially confined by the side walls, floor and ceiling. Yet, a primary purpose of the exhibit 10 and the walk-through passageway 12 is to visually present features of the heart attributed to the interior walls of the passageway 12. As shown herein, the various embodiments of the invention take advantage of visual representations and reading material to convey information. The passageway 12 itself is a platform for the presentation materials. In some embodiments, lighting strings 23 may be secured about the walls and flow of the passageway 12 as described. In a preferred embodiment, to enhance viewing within the walk-through passageway, strips of Velcro™-mounted micro light-emitting-diode (LED) lights are selectively placed throughout the passageway 12 and used to illuminate the passageway and the information presented therein.

Figure 5:
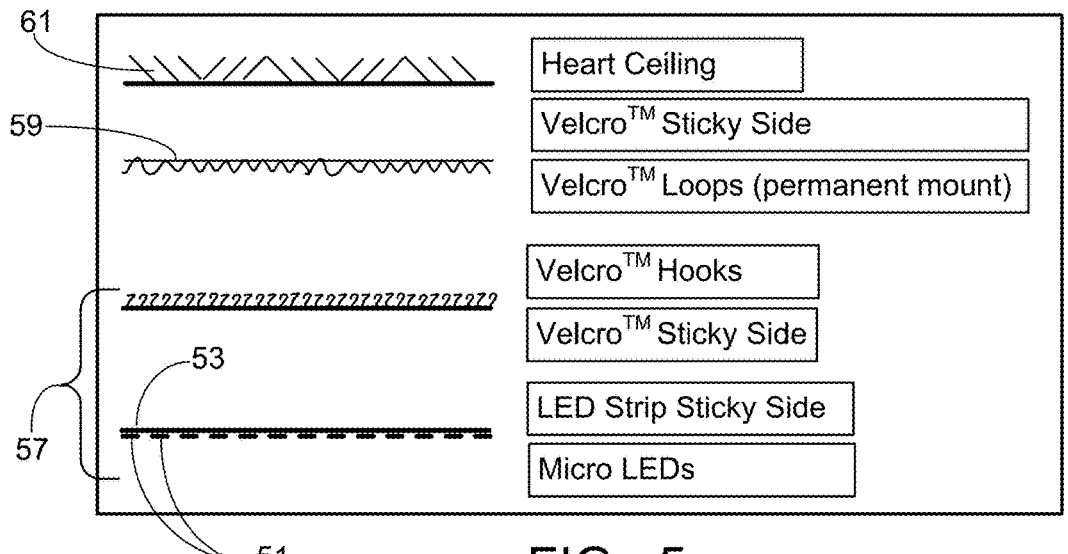
FIG. 5 is a schematic illustrating an exploded view of an LED strip removably attached to a ceiling surface of the walk-through passageway, according to the present disclosure.

A preferred construction of these lighting devices is illustrated in the exploded schematic of FIG. 5. The LED lights are solid state devices that can illuminate effectively without requiring the heating of a filament. Thus, very little heat gain is generated inside the model 11. Referring to FIG. 5, the micro-LEDs 51 are mounted to the adhesive side of a flexible polymeric substrate 53. This substrate 53 is, in turn, attached with the "hook" side 55 of a Velcro™ hook and loop system, to make a flexible, attachable strip of LED lighting. The other part of this strip system is a base strip 59 of the Velcro™ loop layer, which is attached along the wall or ceiling 61 of the walk-through passageway. This strip lighting system, with its Velcro™ hook and loop attachment system, facilitates attachment and removal of the LED lights. The base strip 59 may be permanently located along or on the desired location in the walk-through passageway. During set up, and after inflation of the structure 11, the flexible LED strip 57 may be easily matched with the permanent locations of the base strip 59. Of a particularly low profile, the LED strip lighting system is unobtrusive and occupies minimal space in the walk-through passageway 12. The LED strip lighting system, therefore, enhances the viewing aspect of the model 11 and also facilitates the set-up and breakdown of the inflatable structure.

Other methods of illumination, such as the provision of transparent plastic windows along the walls of the passageway may also be employed.

The outside of the infrastructure 11 also serves as a presentation platform of the exhibit 10. As shown in FIG. 3 the outside surface 29 also displays features of the heart (and heart disease). These features include the shape and contour of portions of the heart, the veins on the outside of the heart, as well as both vena cava and pulmonary arteries. The outside surface may also accommodate informational plaques 20 and physical representations 21 of diseases or defects, as described previously. In further embodiments, the outside surface 29 may be equipped with transparent windows allowing views into the inside of the heart. The veins may also be provided by transparent or almost transparent tubes or sacs to simulate blood flow or blood conditions. In various embodiments, the veins are provided in bluish and reddish tones to represent transport of de-oxygenated and oxygenated blood, respectively. Thus, in one respect, the outside surface 29 of the model 11 is an extension of a continuous informative walk-through passageway 12 of the exhibit 10 that enters and exits the inside of the heart model 11 as well as traversing the perimeter of the heart model 11.

Figure 6:
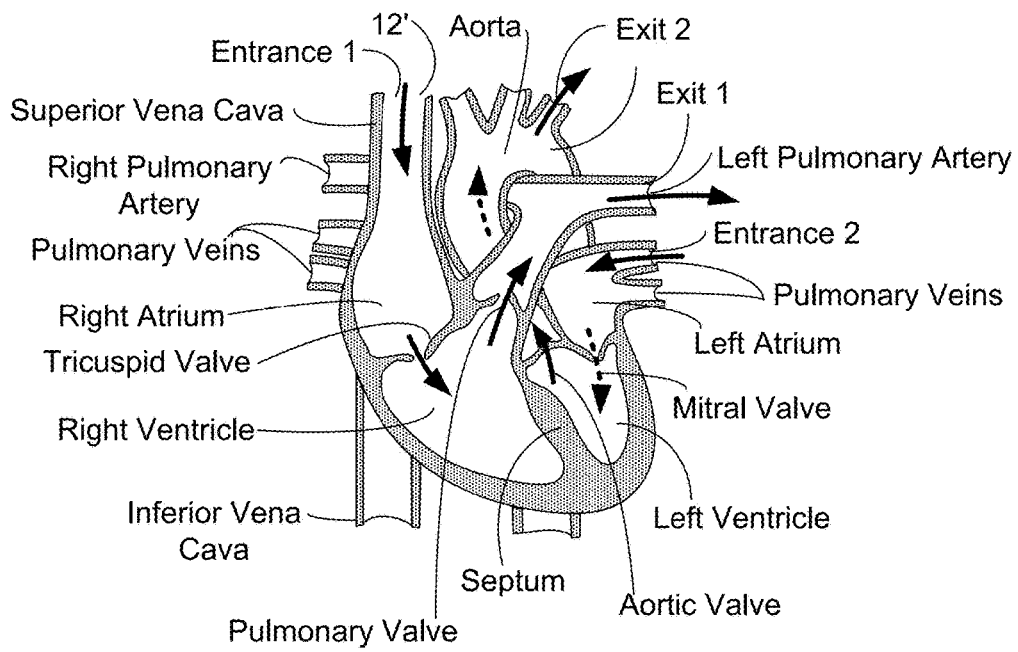
FIG. 6 is a simplified cross-sectional view illustrating an alternative walk-through passageway through a heart, according to the present disclosure.

FIG. 6 illustrates an alternative embodiment of an exhibit according to the present disclosure and more particularly, an alternate walk-through passageway (represented by a sequence of directional arrows). The walk-through passageway may be incorporated with other elements of the exhibit as described previously in respect to FIGS. 2-4. The alternative passageway 12' allows the visitor to take the pathway that blood takes in the heart. Deoxygenated blood enters the right side of the heart (Entrance 1) and is then pumped out of the heart via the pulmonary artery (Exit 1) to the lungs where it is oxygenated. The oxygenated blood then reenters the left side heart via the pulmonary veins (Entrance 2) and then pumped out to the body via the aorta (Exit 2). In further embodiments, a walk-through representation of the lungs is incorporated with the heart structure. In this way, the visitor's pathway corresponds with the actual path taken by blood circulating in the heart and lungs, and perhaps the rest of the human body. In these embodiments, inflatable representations of the pulmonary arteries would serve to direct the visitor from the right ventricle of the heart to the lung(s) and then back again into the left atrium via inflatable representations of the pulmonary veins.

The foregoing description of the present invention has been presented for purposes of illustration and description. It is to be noted that the description is not intended to limit the invention to the various systems, apparatus, and processes disclosed herein.

What is claimed is:

1. An inflatable model of the human heart, the model comprising:
   an inflatable infrastructure inflatable to a three-dimensional partial representation of the human heart at a scale greater than 15:1, the infrastructure including a cross-sectional plane thereacross; and
   a walk-through passageway defined, at least in part, by the inflated infrastructure, and extending through the inflated infrastructure, wherein the cross-sectional plane defines a flat plane of the passageway; and a cross-sectional plane cut through a human heart thereby providing said partial representation of the human heart above said plane;
   wherein the passageway includes rooms representing chambers of the heart; and
   wherein the infrastructure includes inflatable walls inflatable to present inflated walls defining, at least partly, walls of the rooms representing chambers of the heart and the passageway, said inflated walls extending upwardly from the cross-sectional plane to define the three-dimensional partial representation of the heart thereabove;
   physical representations of internal portions of the human heart within said inflatable infrastructure; and
   an outside surface representing, in shape and contour, the outside surface of the human heart in an inflatable state of the inflatable infrastructure, and extending upwardly from said cross-sectional place and over four rooms representing each of the chambers of the human heart; and wherein said inflatable infrastructure includes inflatable walls separating said rooms representing chambers of the heart and wherein said passageway including physical representations of internal parts of the heart other than chamber walls, including a physical representation of a heart valve.

2. A method of exhibiting a human heart for educational purposes, the method comprising the steps of:
   providing an inflatable infrastructure inflatable to a three-dimensional representation of the human heart at a scale greater than 15:1, the infrastructure including a cross-sectional plane thereacross and a walk-through passageway defined, at least in part, by the inflated infrastructure, and extending through the inflated infrastructure, wherein the cross-sectional plane defines a plane of the passageway;
   inflating the infrastructure to erect a three-dimensional inflated model of the heart, including inflating inflatable walls of the infrastructure to reveal rooms representing chambers of the human heart and the passageway; and
   directing a visitor into and through the passageway and through the model heart, the passageway being a path that leads the visitors through inflated physical representations of internal parts of the heart other than walls representing chamber walls; and
   wherein said inflating infrastructure inflates inflatable walls separating said rooms representing chambers of the heart and wherein said directing includes directing through parts of said passageway that are physical representations of internal parts of the heart other than chamber walls, including a physical representation of a heart valve.

3. The method of claim 2, further comprising:
   deflating the inflatable structure after the directing steps; and
   moving the inflatable infrastructure to a different site; and
   repeating the inflating and directing steps at the different site.

4. The method of claim 2, wherein inflating the infrastructure includes setting the infrastructure un-inflated on said plane such that during inflating, said inflatable walls inflate and extend upwardly from the plane to reveal the rooms representing chambers of the heart and the passageway.

5. The method of claim 4, wherein upon inflating the infrastructure, said passageway extends through the model in a one-story pathway.

6. The method of claim 5, wherein inflating the infrastructure inflates walls defining said passageway as a one-story pathway through the model heart.

7. An inflatable exhibit of a human heart comprising:
   an inflatable infrastructure inflatable to a three-dimensional representation of the human heart at a scale greater than 15:1; and
   a walk-through passageway defined, at least in part, by the inflated infrastructure, and extending through the inflated infrastructure;
   wherein the infrastructure includes inflatable walls that are inflatable to define rooms representing chambers of the heart and the walk-through passageway; and
   an outside surface shaped and contoured to represent at least portions of the outside of a human heart and extending over each of the rooms representing chambers of the heart, the outside surface including three-dimensional forms representing physical features of the heart.

8. The inflatable exhibit of claim 7, wherein said inflatable walls define, at least in part, the walk-through passageway such that the passageway is maintained to a generally one-story pathway.

9. The inflatable exhibit of claim 8, wherein a vertical cross section of passageway is defined at a bottom portion by a surface plane and the remaining portion of the vertical cross-section is a two-dimensional portion extending from the plane and defined by inflated walls of the inflated infrastructure.

10. The inflatable exhibit of claim 7, wherein the walk-through passageway is disposed such that one or more of said chambers is observable from said passageway.

11. The inflatable exhibit of claim 7, wherein said passageway extends through at least two chambers as a one-story pathway.

12. The inflatable exhibit of claim 7, wherein the passageway includes rooms representing each of three chambers of the heart, including two rooms representing a left ventricle and a right ventricle, respectively. and sharing a common inflatable wall.

13. The inflatable exhibit of claim 12, wherein the inflatable structure includes an inflatable wall between representations of the left and right ventricles, the wall representing the septum and the passageway being provided by an opening made in the wall to represent a septal defect.

14. The inflatable exhibit of claim 7, wherein inflated walls of the inflated infrastructure are contractable and expandable to simulate movements of a beating heart.

15. The inflatable exhibit of claim 7, wherein the passageway includes inflatable walls having tubes for simulating blood flow.

16. The inflatable exhibit of claim 7, wherein the exhibit further includes an outside surface of the inflatable infrastructure modeling the outside of the human heart, said outside surface having said shape and contour extending from a bottom of the exhibit and upwardly over said rooms representing chambers of the heart.

17. The inflatable exhibit of claim 7, wherein the outside surface includes inflatable physical representations of veins or arteries.

18. The inflatable exhibit of claim 7, wherein the infrastructure includes a cross-sectional plane thereacross, the passageway and at least two rooms representing chambers of the heart extending upwardly therefrom.

19. The inflatable exhibit of claim 7, further comprising a cross-sectional plane representing a plane cut through a human heart, wherein the plane coincides with a bottom plane of the inflated infrastructure and defines a partial representation of the human heart thereabove.

20. The method of the claim 2, further comprising contracting and expanding inflated walls of the inflated infrastructure to simulate movements of a beating heart.

21. The inflatable exhibit of claims 7, wherein said outside surface extends over said chambers such that a first room representing a left ventricle and a second room representing a right ventricle are disposed adjacent one another and share an inflatable wall, and a room representing a right atrium is disposed adjacent said room representing a right ventricle and a room representing a left atrium is disposed adjacent said room representing a left ventricle and an inflatable wall is disposed between said rooms representing said left atrium and right atrium, and wherein said outside surface is shaped and contoured to represent an exposed outside surface of the human heart extending over said chambers of the heart.

22. The inflatable exhibit of claim 7, further comprising physical representations located in said rooms of internal parts of the heart other than wall representing heart chamber walls.

23. The inflatable exhibit of claim 7, wherein the outside surface includes physical representations of veins or arteries.

24. An inflatable exhibit of a human heart comprising:
an inflatable infrastructure inflatable to a three-dimensional representation of the human heart at a scale greater than 15:1;and
a walk-through passageway defined, at least in part, by the inflatable infrastructure, and extending through the inflated infrastructure;
wherein the infrastructure includes inflatable walls that are inflatable to define chambers of the heart and the walk-through passageway; and
wherein inflated walls of the inflated infrastructure are contractable and expandable to simulate movements of a beating heart.

25. The exhibit of claim 24, wherein said inflatable infrastructure includes inflatable walls separating said rooms representing chambers of the heart and wherein said passageway includes physical representations of internal parts of the heart other than chamber walls, including a physical representation of a heart valve.

26. The exhibit of claim 24, further comprising an outside surface shaped and contoured to represent at least portions of the outside of a human heart, the outside surface including three-dimensional forms representing veins or arties.

* * * * *